Feb. 13, 1940.　　　　F. DRENKO　　　　2,190,559
COUPLED RANGE FINDER
Filed Dec. 20, 1938　　　　3 Sheets-Sheet 1

INVENTOR.
Fred Drenko
BY Lancaster, Allwine and Rommel
ATTORNEYS.

Feb. 13, 1940.  F. DRENKO  2,190,559
COUPLED RANGE FINDER
Filed Dec. 20, 1938  3 Sheets-Sheet 2

INVENTOR.
Fred Drenko

BY Lancaster, Allwine and Rommel
ATTORNEYS.

Feb. 13, 1940. F. DRENKO 2,190,559
COUPLED RANGE FINDER
Filed Dec. 20, 1938 3 Sheets-Sheet 3

INVENTOR.
Fred Drenko
BY *Lancaster, Allwine and Rommel*
ATTORNEYS

Patented Feb. 13, 1940

2,190,559

UNITED STATES PATENT OFFICE 2,190,559

COUPLED RANGE FINDER

Fred Drenko, Mobile, Ala.

Application December 20, 1938, Serial No. 246,896

7 Claims. (Cl. 95—44)

This invention relates to improvements in range finders that may be coupled or synchronized with a camera lens and an important object is to provide a range finder which may be attached to or built into the case of a folding camera and which may be readily swung to an out-of-the-way position when not in use, without uncoupling the same from the camera lens.

Another object of the invention is to provide a range finder which is swingable between operative and inoperative positions and including means securing the range finder against casual displacement from either of said positions.

A further object is to provide a combined range finder and view finder permitting the observation of a natural full size view in the normal manner of vision, while the subject is retained in precise focus.

Yet another object resides in the provision of a range finder that may be attached to existing cameras, or built into new cameras.

A still further object is to provide a coupled range finder for a folding camera which may be swung to an inoperative position for folding within the camera body, and so as to not interfere with normal operation of the camera when the use of the range finder is not required.

Another and important object of the invention is to provide a range finder which is swingable, while coupled to a camera lens, into a protective housing exteriorly of the camera case, when not in use.

Other objects and advantages of the invention will be apparent from the following detailed description, taken in connection with the accompanying drawings, forming a part of this specification, and in which drawings.

Figure 1:
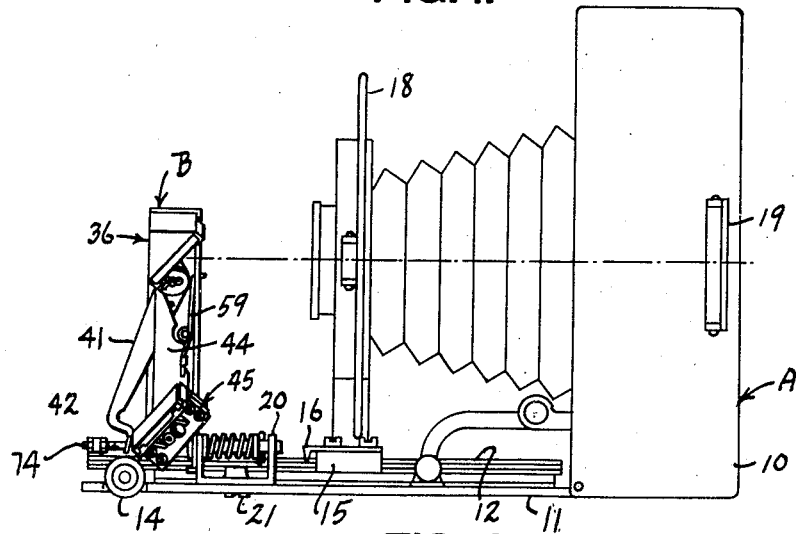
Figure 1 is a view in side elevation of a collapsible camera equipped with a preferred form of my folding coupled range finder, the parts being disposed in their positions of use.
Figure 2:
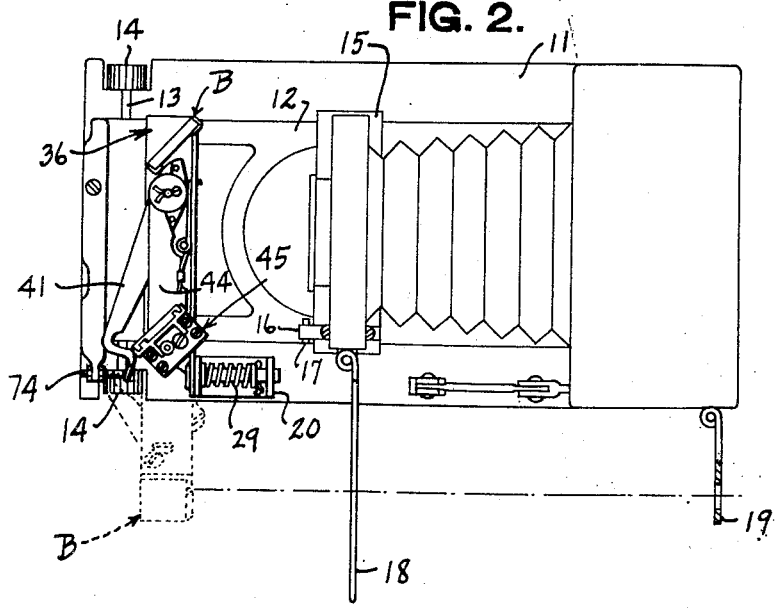
Figure 2 is a top plan view of the camera with the range finder disposed in its folded position, and showing in broken lines the position of the range finder when extended for use.

In the drawings, which show preferred and modified forms of the invention, and wherein similar reference characters denote corresponding parts throughout the several views, the letter A designates a folding camera, B a range finder adapted to be mounted interiorly thereof, and C a modified form of range finder for mounting exteriorly of the camera.

In the example shown, the camera A is of the same general character disclosed in U. S. Patent 704,378. Hinged to swing downwardly and outwardly of the camera case 10 is a closure panel 11 which constitutes a stationary bed when the camera is open. Slidably mounted on the stationary bed for rectilinear movement therealong is a movable bed 12 which may be rocked forwardly or rearwardly of the stationary bed by means of a pinion shaft 13 and control knobs 14. Slidably mounted on the movable bed 12 is a lens carriage 15 movable into and out of the camera case. Means is provided for locking the lens carriage against casual displacement from a predetermined position relative to the movable bed and outwardly of the camera case. In the example shown, a catch 16 secured to the lens carriage enters a notch 17 in the movable bed upon movement of the lens carriage from the camera case to said predetermined position. When so positioned, the lens carriage may be adjusted by means of the control knob 14 to bring the camera into focus. The camera A may also include a view finder comprising a rectangular wire frame 18 pivotally secured to the lens carriage in any suitable manner and an eye piece 19 pivotally secured to a side wall of the camera case.

Referring to the range finder B, shown in Figures 1-6, the same includes a bracket 20 adapted to be secured to the interior side of the closure panel or stationary bed 11 alongside the movable bed 12, as by a screw 21. Mounted for rotation in the spaced-apart bracket arms 22 is a pivot shaft 23 having its axis extending in the direction of movement of the movable bed 12. Fixed to the shaft 23 is a disc-like hub portion 24 having spaced apertures 25 co-acting with a bracket arm lug 26 upon rotation of the shaft 23. The disc-like hub portion 24 may include a tooth-like peripheral abutment 27 engaging a bracket arm stud 28 to limit rotation of the hub portion. Encircling the shaft 23 intermediate the bracket arms is an expansion coil spring 29 retained, as by washer 30 and cotter pin 31, in a state of compression so as to urge the hub portion 24 and the adjacent bracket arm toward one another in a manner securing the bracket arm lug 26 against casual displacement from either of the apertures 25.

Integral with the hub portion 24 is a range finder arm 32 including a supporting flange 33, provided, at its outer or free end portion, with an elongate slot 34, for adjustably carrying, as by means of screw 35, a stationary component 36 of the range finder. This component 36 may include a combined light transmitting and deviating means, such as a glass pane 37 provided with a silvered intramarginal portion 38. The pane may be cemented or otherwise suitably secured in a hollow triangular prismatic frame 39 forming a hood.

Pivotally secured to the supporting flange 33, as by pin 40, is a range finder control lever 41 having a contact portion 42 swingable in an arc substantially co-extensive with the axis of shaft 23. Mounted for pivotal movement on the flange 33, as by pin 43, is a supporting lever 44 for the movable component 45 of the range finder. The latter may include light deviating means, such as a silvered pane or mirror 46, cemented or otherwise secured in a frame 47 providing an adjustable right angular flange 48.

Disposed in spaced parallel relation to the main body portion of the lever 44 is a supporting platform 49, through which the pin 43 extends. Encircling the free end portion of the pin 43 is a washer 50, secured by means of a pin 51 extending transversely through the pin 43. The movable component 45 is secured to the platform 49 by means of a cap screw 52 passing through a central opening 53 in the flange 48 and threading into an opening 54 in the platform 49. In order to accommodate the washer 50 and pin 51, an aperture 55 is formed in the flange 48. Four setscrews 56 are threaded into openings 57 at opposite corners of the flange 48 whereby to adjustably engage the platform 49.

Encircling a pin 58 on the supporting flange 33 is helical spring 59 terminating in oppositely extending end portions, one end portion 60 extending through a hole 61 in the finder arm 32 and the other end portion 62 engaging an ear 63 on the supporting lever 44. This spring urges the supporting lever in one direction of its pivotal movement and the control lever 41, through the engagement of a pin 64 with the tip end portion 65 of the supporting lever 44, is adapted to impart motion thereto in the opposite direction. The lever 41 may be provided with a boss 66 to provide clearance for the lever 44 when the washer 67 is secured, as by cotter pin 68, to the pivot pin 40. A projection 69 on the control lever bears against the edge of the supporting lever 44 so as to limit outward swinging of the contact end portion 42.

Secured transversely of the outer end portion of the movable bed 12, as by screw 70, is an operating member 71 having an end 72 overhanging the stationary bed and adjustably carrying, as by means of lock nuts 73, a threaded pin 74 having its axis aligning with the axis of the shaft 23, and arranged to engage the contact portion 42 of the range finder control lever 41.

Figure 3:
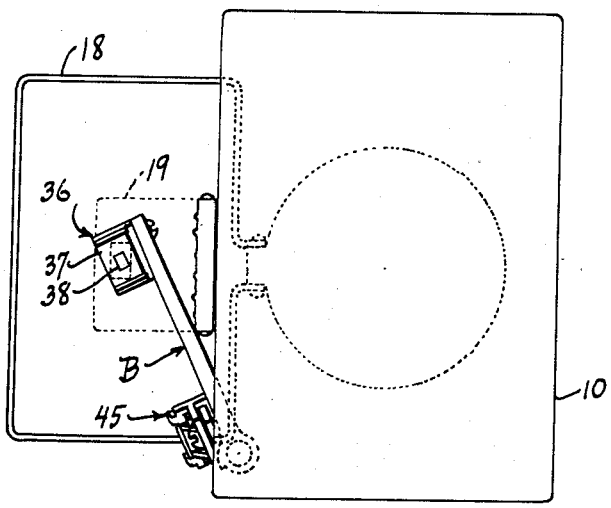
Figure 3 is a view in rear elevation of the camera with the range finder in its position of use, and with a portion of the camera eye piece broken away to better illustrate the relationship of parts.
Figure 5:
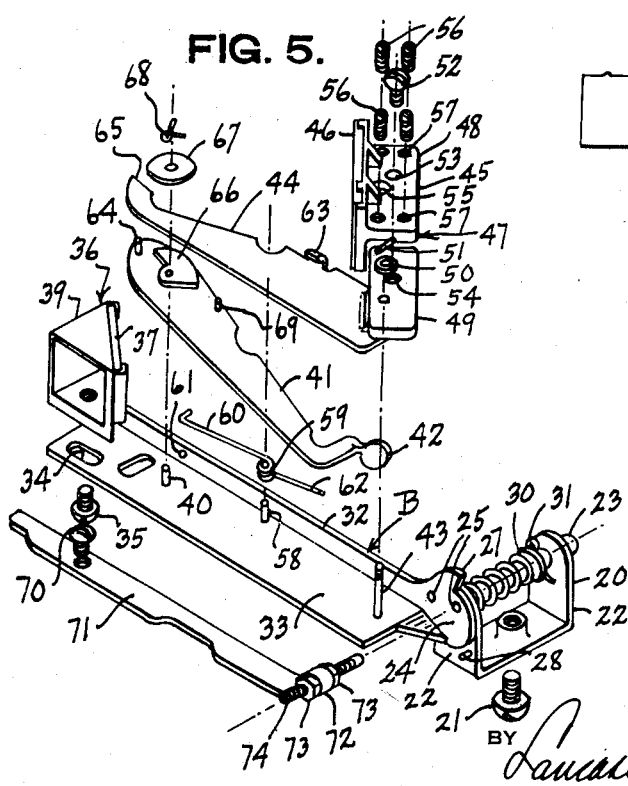
Figure 5 is a perspective view of the range finder with parts thereof in disassembled relationship.
Figure 4:
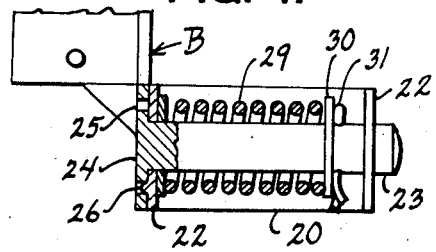
Figure 4 is a fragmentary sectional view of the range finder supporting bracket and pivot.
Figure 6:
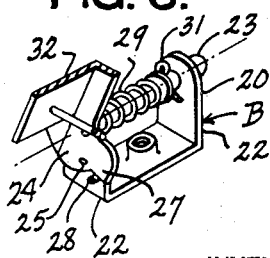
Figure 6 is a fragmentary perspective view of the range finder supporting bracket and pivot.

In the operation of the camera A equipped with range finder B, the lens is drawn out to the position in which the catch 16 locks the lens against casual displacement relative to the movable bed, and the eye piece and wire frame are folded out to viewing position. Then the range finder is lifted up and swung to its operating position where it snaps into place. This operating position is not perpendicular to the camera bed as the range finder leans outwardly to align with the view finder, as illustrated in Figure 3. The photographer observes the view in natural size and normal manner of vision. At the approximate center of the field is seen a small area of the view out of register with the general view, should the lens be out of focus. By turning the focusing knob 14 these two areas are seen to slide relative to each other and when they coincide or are superimposed, the camera lens is in precise focus. As the pin 74, contact portion 42, and range finder pivot shaft 23 are always in substantial alignment, the range finder may be swung to any desired position without uncoupling from the lens.

Figure 7:
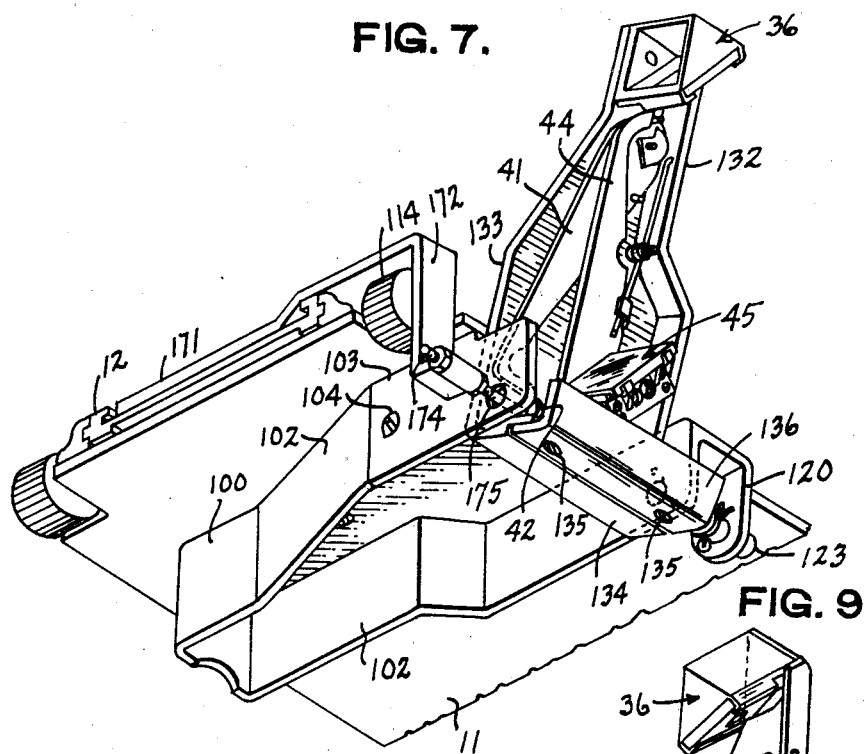
Figure 7 is an inverted perspective view of a modified form of range finder and showing its application to an exterior portion of the camera, the parts being disposed in their positions of use.
Figure 9:
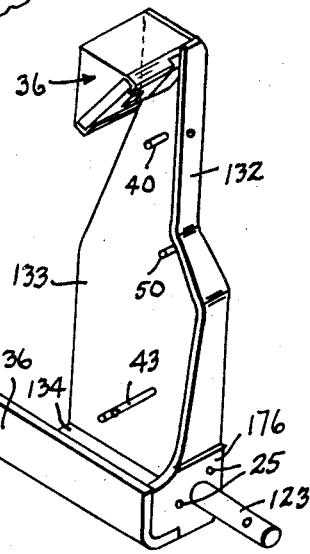
Figure 9 is a perspective view of the pivot arm of the range finder shown in Figure 7.
Figure 8:
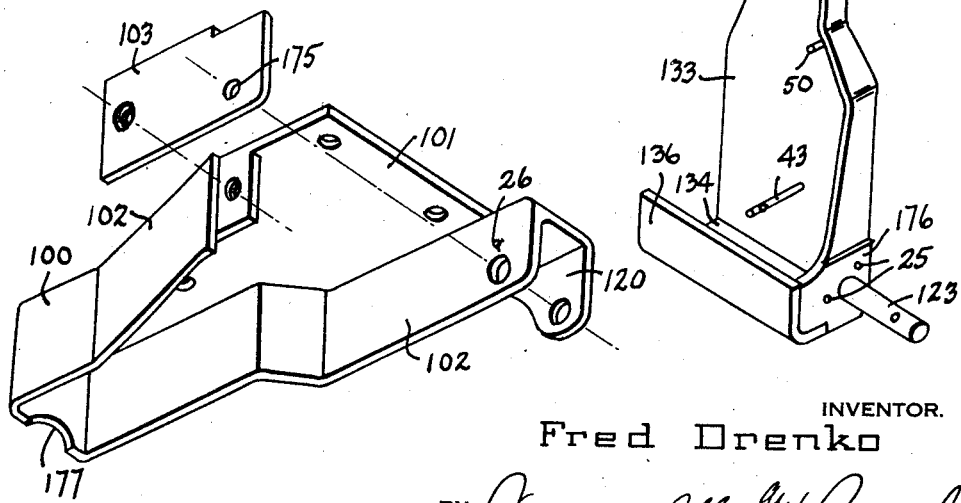
Figure 8 is an inverted perspective view of the frame of the range finder shown in Figure 7.

Referring now to the range finder C shown in Figures 7-9, there is provided a box-like frame 100 including an end wall 101 for attachment to the exterior or lower side of the camera closure panel or stationary bed, and side walls 102 including a portion 103 which is removably secured, as by screw 104. The side walls 102 include an integral bracket portion 120 similar to the bracket 20 of the previously described range finder B. By removing the portion 103, the pivot shaft 123 of the range finder arm 132 is enterable into the bracket portion 120. The range finder arm carries a stationary component 36, control lever 41, and supporting lever 44 for the movable component 47 in the same manner as the arm 32 of the finder B. The supporting flange 133 is wider than the flange 33 of the previously described finder, and the side walls 102 of the frame 100 are correspondingly wide, in order that the control lever 41 shall be free to swing to its outward limit while disposed between the side walls 102. As the end wall 101 is terminated inwardly of the bracket portion 120 in order to permit swinging of the range finder arm 132 to its upwardly and outwardly inclined operating position, the finder arm may be provided with a right angular flange 134 having secured thereto, as by screws 135, an angle plate 136, which is removable to permit adjustment of the movable component 45.

To the movable bed 12 is secured an operating member 171 having a downwardly bent end portion 172 adjacent the focusing knob 114, which is preferably reduced in width so as to accommodate the end portion 172 in a manner not interfering with folding of the camera. Carried by the end portion 172 is a threaded contact pin 174, disposed in co-axial alignment with the pivot shaft 123 and adapted to engage the contact portion 42 of the operating lever 41 by passing through an opening 175 in the portion 103 of the frame. The width of the flange 133 is sufficiently less than the corresponding distance between the opposite side walls 102 of the frame to allow slight axial movement of the shaft 123, so that the openings 25 of the finder arm 132 may be disengaged from the lug 26 of the frame 100 when the finder arm is to be swung out. The side of the finder arm resting against the bracket portion may include a shoulder 176 to provide clearance for the finder arm when the same is entering the frame. To facilitate extraction of the finder arm from the frame, the edge of the frame may be provided with an arcuate notch 177. It will be noted that the finder arm walls 133, 134 and 136 form a pivotally mounted closure for the box-like frame and that the range finder mechanism, by reason of its mounting on the inner side of the closure, is swingable between protected and exposed positions while coupled, and without injury to the control lever, even though the camera bed has not been returned to a normal position.

Various changes may be made in the forms of invention herein shown and described, without departing from the spirit of the invention or the scope of the following claims.

I claim:

1. The combination with a camera including film and lens carrying elements, one of which is mounted for rectilinear movement relative to the other for a focusing purpose, of a range finder including a movable component, means securing the range finder to one of said elements for pivotal movement about an axis extending in the direction of said rectilinear movement, said range finder including a control member for the movable component, said control member having a portion movable in a path co-extensive with said axis, and an operating member secured to the other of said elements and contacting the movable portion of said control member.

2. In a camera including a stationary bed, a movable bed mounted on the stationary bed for rectilinear movement relative thereto, a range finder including a movable component, means pivoting said range finder to one of said beds for swinging movement about an axis extending in the direction of said rectilinear movement, said range finder including a control lever for the movable component, said control lever having a contact portion movable in a path co-extensive with said axis, and an abutment carried by the other of said beds and engaging said contact portion.

3. The combination with a folding camera including a case, a closure panel hinged thereon and swingable between closed and open positions, said panel in its open position constituting a stationary bed, a movable bed mounted on the stationary bed for rectilinear movement therealong, a lens carriage mounted on the movable bed for movement into and out of said case, and means releasably securing the lens carriage against casual displacement from a predetermined relationship to said movable bed, of a range finder including a movable component, means pivoting said range finder to one of said beds for swinging movement between extended and folded positions about an axis disposed in the direction of said rectilinear movement, said range finder including a control lever for the movable component, said lever having a contact portion movable in a path substantially aligning with said axis, and an abutment carried by the other of said beds for engagement with said contact portion.

4. The combination with a folding camera including a case, an eye piece secured to the case, a closure panel hinged to the case and swingable between closed and open positions, said panel in its open position constituting a stationary bed, a movable bed mounted on the stationary bed for rectilinear movement therealong, a lens carriage mounted on the movable bed for movement into and out of said case, a view framer secured for movement with the lens carriage, and alignable with the eye piece, and means releasably securing the lens carriage against casual displacement from a predetermined relationship to said movable bed and outwardly of said case, of a range finder including a movable component, means pivoting said range finder to one of said beds for swinging movement between positions of alignment and disalignment with said eye piece and view framer, and about an axis extending in the direction of said rectilinear movement, said range finder including a control member for the movable component, said member having a contact portion movable in a path substantially aligning with said axis, and an abutment carried by the other of said beds for engagement with said contact portion.

5. In combination with a camera including a pair of elements, one movable relative to the other during focusing of the camera, a range finder comprising a box-like frame attached to one of said elements, a closure, means pivoting the closure to the frame for swinging movement between closed and open positions relative to the frame, range finder mechanism carried by said closure at its inner side and including a movable component and a control member therefor, said control member having a contact portion movable within said frame in a path substantially co-axially aligning with said pivot means, said frame being provided with an opening in substantial alignment with said pivot means, and an operating member attached to the other of said camera elements, said operating member having a portion insertable thru said opening for engagement with said contact portion.

6. In combination with a camera including a pair of elements, one movable relative to the other during focusing of the camera, a range finder comprising a box-like frame attached to one of said elements, a closure, means pivoting the closure to the frame for swinging movement between closed and open positions relative to the frame, means securing said closure against casual displacement from any of said positions, range finder mechanism carried by said closure at its inner side and including a movable component and a control member therefor, said control member having a contact portion movable within said frame in a path substantially coaxially aligning with said pivot means, said frame being provided with an opening in substantial alignment with said pivot means, and an operating member attached to the other of said camera elements, said operating member having a portion insertable thru said opening for engagement with said contact portion.

7. The combination with a folding camera including a case, a closure panel hinged thereon and swingable between closed and open positions, said panel in its open position constituting a stationary bed, a movable bed mounted on the stationary bed for rectilinear movement therealong, a lens carriage mounted on the movable bed for movement into and out of said case, and means releasably securing the lens carriage against casual displacement from a predetermined relationship to said movable bed, of a range finder including a movable component, means pivoting said range finder to one of said beds for swinging movement between extended and folded positions about an axis disposed in the direction of said rectilinear movement, means securing said range finder against casual displacement from any of said positions, said range finder including a control lever for the movable component, said lever having a contact portion movable in a path substantially aligning with said axis, and an abutment carried by the other of said beds for engagement with said contact portion.

FRED DRENKO.